United States Patent
Konrad et al.

(10) Patent No.: US 8,521,309 B2
(45) Date of Patent: Aug. 27, 2013

(54) METHOD FOR OPERATING A SYSTEM OF FIELD DEVICES

(75) Inventors: Stephan Konrad, Rieden (DE); Rainer Pollath, Ruckholz (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 195 days.

(21) Appl. No.: 13/060,367

(22) PCT Filed: Aug. 6, 2009

(86) PCT No.: PCT/EP2009/060174
§ 371 (c)(1),
(2), (4) Date: Feb. 23, 2011

(87) PCT Pub. No.: WO2010/026015
PCT Pub. Date: Mar. 11, 2010

(65) Prior Publication Data
US 2011/0153037 A1     Jun. 23, 2011

(30) Foreign Application Priority Data
Aug. 26, 2008   (DE) .......................... 10 2008 039 696

(51) Int. Cl.
*G05B 11/01*      (2006.01)
(52) U.S. Cl.
USPC ............................................. 700/19; 700/21

(58) Field of Classification Search
USPC ...................................................... 700/19, 21
See application file for complete search history.

(56) References Cited

U.S. PATENT DOCUMENTS

| 7,986,657 B2 * | 7/2011 | Dobrowski et al. ........... 370/328 |
| 2005/0055585 A1 * | 3/2005 | Maier ........................... 713/300 |

FOREIGN PATENT DOCUMENTS

| DE | 10151119 | 4/2003 |
| DE | 69726764 | 10/2004 |
| DE | 60018072 | 12/2005 |
| DE | 102004037064 | 2/2006 |
| DE | 102006036770 | 2/2008 |
| DE | 102007046572 | 4/2008 |
| DE | 102007061239 | 7/2008 |
| WO | WO 2005103851 | 11/2005 |
| WO | WO 2010026015 | 3/2010 |

* cited by examiner

*Primary Examiner* — Ryan Jarrett
(74) *Attorney, Agent, or Firm* — Bacon & Thomas, PLLC

(57) ABSTRACT

A method for operating a system of field devices, wherein the system has at least two field devices, and wherein the field devices especially are measuring devices and/or actuators and/or display devices. A second field device is activated by a first field device, and that, in the case of a successful activation of a field device different from the first field device, the first field device is deactivated.

14 Claims, 2 Drawing Sheets

METHOD FOR OPERATING A SYSTEM OF FIELD DEVICES

TECHNICAL FIELD

The invention relates to a method for operating a system of field devices, wherein the system has at least two field devices, and wherein the field devices are especially measuring devices and/or actuators and/or display devices. The system is, for example, a system for process automation.

BACKGROUND DISCUSSION

In modern measuring—and control technology, often a number of field devices, especially measuring devices, actuators or also display devices, are connected with one another via a bus. For this, there are also already different data protocols (4-20 mA signals, Foundation Fieldbus or Profibus PA).

A problem usually lies in the energy supply of the individual devices.

SUMMARY OF THE INVENTION

An object of the invention is to provide a method for operating a system of field devices in which especially the energy problem is treated.

The invention solves the object by features including that a second field device is activated by a first field device and that, upon successful activation of a field device different from the first field device, the first field device is deactivated.

An embodiment provides that the system has at least three field devices and that a third field device is activated in the case of an unsuccessful activation of the second field device by the first field device.

An embodiment provides that the system has a number of field devices, and that in the case of an unsuccessful activation of the second field device, other field devices are activated by the first field device until an additional field device is successfully activated.

An embodiment provides that from at least one field device, after its activation, a signal is transmitted to the field device, which activated it.

An embodiment provides that at least one superordinated unit is provided, that a signal is transmitted to the superordinated unit from at least one field device after its activation by another field device, and that the transmitted signal is received by the other field device, which activated the field device.

An embodiment provides that at least one superordinated unit is provided, and that from at least one field device, in the case of an unsuccessful activation of another field device, a signal is transmitted to the superordinated unit.

An embodiment provides that the task of the superordinated unit is fulfilled by a field device.

An embodiment provides that the task of the superordinated unit is fulfilled by a control system.

An embodiment provides that in the case of a deactivation of a field device the energy supply of the field device is set below an adjustable value.

An embodiment provides that in the case of the deactivation of a field device the energy supply of the field device is switched off.

An embodiment provides that in the case of the deactivation of a field device the field device is separated from a voltage supply.

An embodiment provides that in the case of an activation of a field device the energy supply of the field device is set above an adjustable value.

An embodiment provides that in the case of an activation of a field device the field device is connected to a voltage supply.

An embodiment provides that at least one superordinated unit is provided and that at least one field device is activated by the superordinated unit.

Thus, a power and bus concept for field devices in a system of field devices is described in the invention. In the case of the method of the invention the sensors/measuring devices or actuators, as examples for the field devices, are completely switched off most of the time, i.e. not in a standby or sleep mode, and are activated only when required, supplied with an electrical voltage for example. The activation can occur e.g. via an address, a logic signal, a separate connecting line or via any desired execution information. Through turning off or completely deactivating the field devices not required and only turning on or activating the required field devices, a low amount of energy is required (minimum energy).

Some advantages of the invention are:

Only the required sensors/actuators are in operation while the remaining field devices are without an energy supply and are turned off. There is a simple control, via which a failed field device or a number of failed field devices are shunted out. Advantages will especially become evident for application in an explosion endangered region, since fewer active capacitances are present. Moreover, since losses on the lines are reduced, longer line lengths are possible. The power that must be supplied is smaller, since only minimal energy is required. Thus, smaller power supplies can be used. Furthermore, such systems are implementable without addressing. The position/address is given by the course of events in the measuring chain. In the case where the field devices are equal, the same embodiment can be used for all. Therefore, the mounting is especially simplified, since all are equal parts and no explicit address is necessary.

BRIEF DESCRIPTION OF THE DRAWINGS

The invention will now be explained in greater detail based on the appended drawing, the figures of which show as follows:

In FIG. 1, a number of field devices F1, F2, F3 through EN are presented, which are connected, via a fieldbus FB, to a superordinated unit SU, which is, by way of example, a control system. The field devices are, for example, measuring devices/sensors, actuators or display devices. In an embodiment, they are, for example, individual temperature sensors. The measuring devices can serve, however, for example, also for determining and/or monitoring the fill level of a medium, its pH-value, its volume flow or its mass flow.

In each case, two adjoining field devices are connected with one another via two lines with the designations and, respectively, the purpose: Activation of the nth field device, AN, and activation of the nth−1 field device, A(N−1). The field devices are additionally connected amongst one another with a data line D and two energy supply lines V1 and V2, and, here, also with the control system CS. Preferably, data are transmitted via the data line D, i.e. in the case of actuator field devices, the control data of the actuators, in the case of sensor field devices, the measurement data or also the parameter data"

and in the case of display field devices, the data to be displayed. The electrical energy is provided via the two supply lines V1 and V2.

A course of events for the method of the invention is, for example, as follows:

1. A first field device F1 is activated by the control system CS, i.e. turned on. Thereupon, the first field device F1 switches to the supply lines V1, V2. Then the field device works and measures, for example, a process variable.
2. The first field device F1 activates a second field device F2.
3. The second field device F2 switches to the supply lines V1, V2 and produces a signal, which it places on the data line D. I.e., at this instant, two field devices F1 and F2 are supplied with energy.
4. The first field device F1 detects the successful activation of the second field device F2 and is deactivated. I.e. now only the second field device F2 is active.
5. The second field device F2 activates the third field device F3 etc.

This operation holds for all correspondingly operated field devices connected to the fieldbus FB. In such a case, field devices can also be connected, which not operated with the method of the invention, but, instead, are e.g. continually activated.

If there is an error after the second step, i.e. after the activation or rather the attempted activation of the second field device F2 by the first field device F1, in that, for example, the second field device F2 outputs no status report, the first field device F1 detects this and attempts activation of the next field device, i.e. the third field device F3. If the third field device F3 is also not activated, the attempt is continued with the next following field devices, until the activation is finally achieved. In an embodiment, unsuccessful activation is also communicated to the control system CS. If activation of one of the following field devices is successful, especially if this is acknowledged by such an activated field device, then the second field device F2 switches itself off. The method is then further executed from this active field device.

Figure 1:
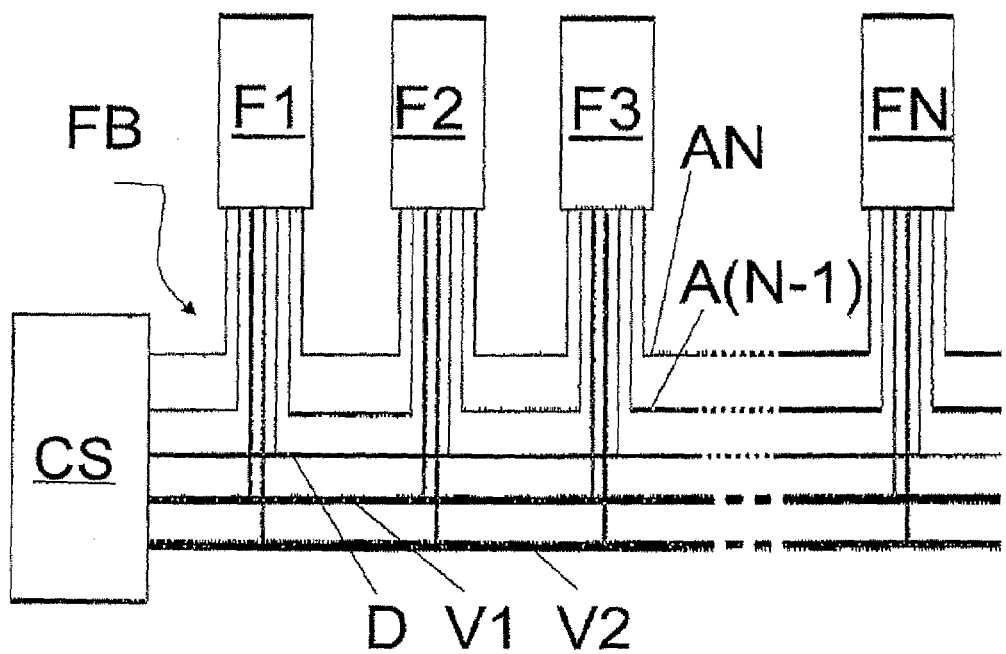
FIG. 1 is a first schematic representation of a system of field devices operated with the method of the invention.
Figure 2:
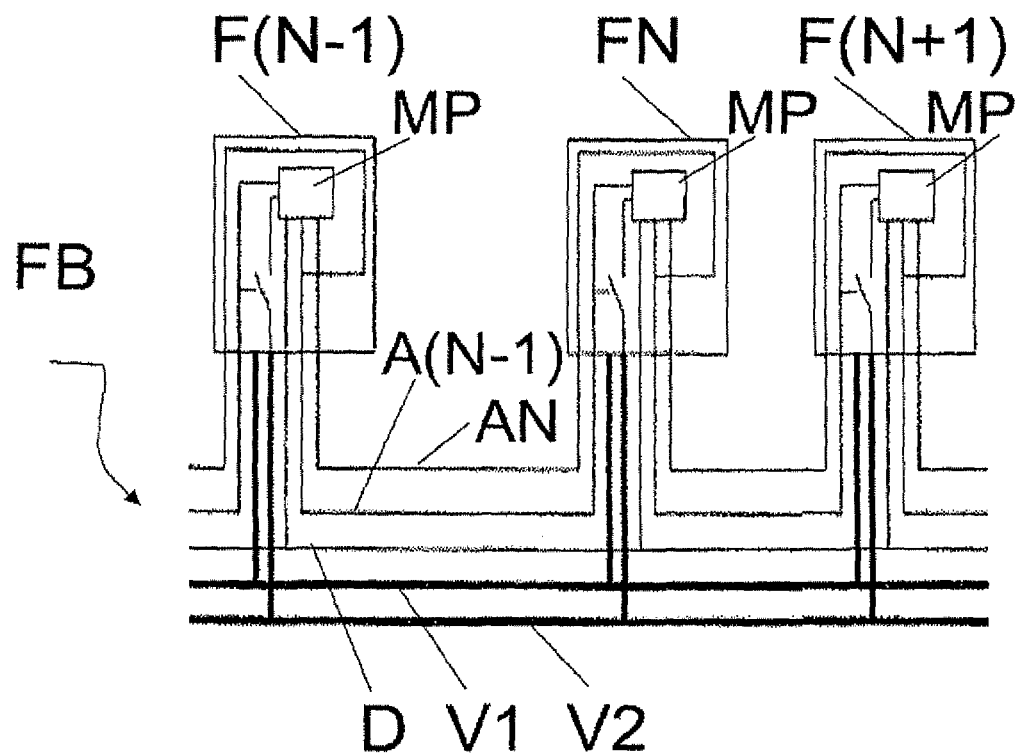
FIG. 2 is a detailed representation of the system of FIG. 1.

In FIG. 2, three field devices are presented in more detail. Here of concern are the field devices F(N−1), FN and F(N+1), thus the predecessor (F(N−1)) and the successor (F(N+1)) of the nth field device FN.

The three field devices are identically embodied and, in each case, connected in the same way to the fieldbus FB. In the field devices, in each case, there is a switchable connection between the activation line A(N−1) of the (nth−1) field device and the second supply line V2. This connection, depending on switch position, is either, in each case, direct, as presented here or extended via the microprocessor MP of the field device, so that the microprocessor MP is either supplied with energy or not. In the variant illustrated here, the activation line AN of the nth field device FN is connected furthermore with the next activation line A(N−1) of the (nth−1) field device and with the microprocessor MP. The microprocessor MP is connected, moreover, with the data line D and the respective field device is totally contacted with the first supply line V1. The respectively activated sensor is the nth sensor.

In this embodiment, thus, the activation is performed via the wiring, and, respectively, therewith a non-activatable field device can also be "jumped over".

The invention claimed is:

1. A method for operating a system of field devices, wherein the system has at least three field devices (N−1), FN, F(N+1), and wherein the field devices are measuring devices and/or actuators and/or display devices, comprising the steps of:

activating a second of the three field devices by a first of the three field devices; and
in the case of successful activation of a second field device by the first field device, the first field device is deactivated,
wherein two adjoining field devices F(N−1) and F(N) are connected with one another via two lines A(N) and A(N−1) having the purpose of activating the nth field device FN and activating the nth+1 field device F(N+1) respectively; and
wherein the field devices F(N−1), FN, F(N+1) are additionally connected amongst one another with a data line and two energy supply lines.

2. The method as claimed in claim 1, wherein:
the system has at least a first field device, a second field device and a third field device; and the method further comprises the step of:
in the case of an unsuccessful activation of the second field device by the first field device, the third field device is activated.

3. The method as claimed in claim 1, wherein:
the system has a plurality of field devices including a first field device and a second field device; and the method further comprises the step of:
in the case of an unsuccessful activation of the second field device by the first field device, other field devices of the remaining field devices of said plurality of field devices are activated until an additional field device is successfully activated.

4. The method as claimed in claim 1, wherein:
from at least one field device of said first, second and third field device, after its activation, a signal is transmitted to the field device that activated it.

5. The method as claimed in claim 1, wherein:
at least one superordinated unit is provided, a signal is transmitted to the superordinated unit by at least one field device after its activation by another field device, and the transmitted signal is also received by the other field device, which activated the field device.

6. The method as claimed in claim 5, wherein:
the task of the superordinated unit is fulfilled by a field device.

7. The method as claimed in claim 5, wherein:
the task of the superordinated unit is fulfilled by a control system.

8. The method as claimed in claim 1, wherein:
at least one superordinated unit is provided, and from at least one field device, in the case of an unsuccessful activation of another field device, a signal is transmitted by said at least one field device to the superordinated unit.

9. The method as claimed in claim 1, wherein:
one of said three field devices is provided with an energy supply; and
in the case of deactivation of said one of said three field devices, the energy supply of said one of said three field devices is set below an adjustable value.

10. The method as claimed in claim 9, wherein:
in the case of a deactivation of a field device, the energy supply of the field device is switched off.

11. The method as claimed in claim 9, wherein:
in the case of a deactivation of a field device, the field device is separated from a voltage supply.

12. The method as claimed in claim 1, wherein:
one of said three field devices is provides with an energy supply; and in the case of activation of said one of said three field devices, the energy supply of one of said three field devices is set above an adjustable value.

13. The method as claimed in claim 12, wherein:
in the case of an activation of a field device, the field device is connected to a voltage supply.

14. The method as claimed in claim 1, wherein:
at least one superordinated unit is provided, and at least one field device is activated by the superordinated unit.

* * * * *